Jan. 18, 1949.  J. N. WOLFRAM  2,459,608
COUPLING FOR TUBES
Filed Jan. 9, 1945
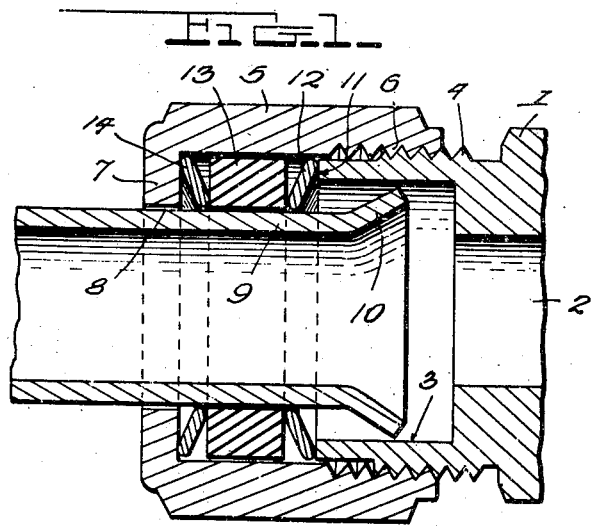
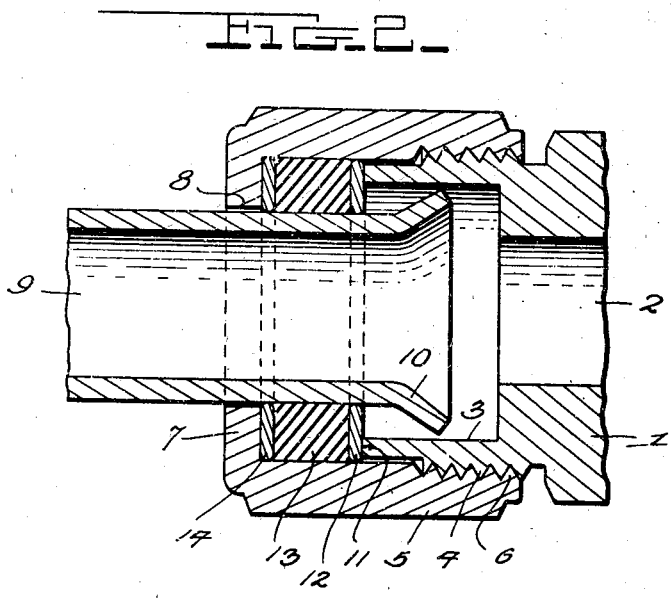
INVENTOR.
John N. Wolfram.
By
Mason, Porter & Diller
Attys Patented Jan. 18, 1949

2,459,608

UNITED STATES PATENT OFFICE 2,459,608

COUPLING FOR TUBES

John N. Wolfram, Cleveland, Ohio, assignor to The Parker Appliance Company, Cleveland, Ohio, a corporation of Ohio Application January 9, 1945, Serial No. 572,026

2 Claims. (Cl. 285—122)

1

The invention relates to new and useful improvements in a coupling for tubes and more particularly a tube having the end thereof flared or enlarged.

An object of the invention is to provide a coupling, wherein the tube is secured to the coupling by metal disks forced by the nut into gripping engagement with the tube and wherein a sealing gasket is deformed by the closing of the coupling so as to provide a tight seal between the coupling and the tube.

In the drawings—

Figure 1 is a longitudinal sectional view through a coupling with the tube assembled therein and the clamping nut in finger-tight engagement with the body member.

Figure 2 is a similar view but showing the coupling closed and the tube gripped and sealed to the coupling.

The coupling embodying the improvements includes a body member 1 having the usual bore 2 therethrough. The body member is counterbored as indicated at 3, and also is provided with a thread 4. Adapted to be secured to the body member is a nut 5 having a thread 6 which cooperates with the thread on the body member. The nut at its outer end has an inwardly extending clamping flange 7 with an opening 8 therethrough. The tube extends through this opening into the coupling.

The tube which is joined to the coupling is indicated at 9. The inner end of the tube is enlarged at 10, and, as illustrated, it is flared outwardly. The counterbore 3 provides a chamber which receives the inner enlarged end of the tube. This counterbore is not necessarily accurately dimensioned as the chamber is merely a space to receive the end of the tube and the tube is not in any way clamped against the body member.

Between the flange 7 and the inner end 11 of the body member is an annular recess. In this annular recess is placed a disk 12 of frusto-conical shape. Also disposed in the annular recess is a ring gasket 13. This ring gasket is located between the metal disk 12 and the flange 7. Preferably there is also a second metal disk 14 which likewise is of frusto-conical shape. The inner diameter of these ring disks 12 and 14 is initially slightly larger than the outer diameter of the tube, and the same is true of the ring gasket 13. The disks, the ring gasket, and the nut are slipped onto the tube before the end of the tube is flared.

In Figure 1 the parts are shown assembled on

2 the tube, and the end of the tube flared and inserted in the chamber formed by the counterbore 3 of the body member. The nut is also engaged with the threads on the body member and finger-tightened. When the nut is turned further onto the body member the flange 7 bearing against the ring 14 will press said ring against the gasket, the gasket in turn against the ring 12, and the ring 12 against the end of the body member. The continued turning of the nut will change these frusto-conical shaped disk members into flat ring members, as shown in Figure 2, disposed substantially at right angles to the surface of the tube and the inner surface of the nut. The ring 12, for example, at its outer periphery contacts with the end of the body member and at its inner side contacts with the gasket, so that the movement of the gasket toward the body member brings about this flattening of the ring. The same is true of the ring 14. The disks are so dimensioned so that when turned into a flat arrangement said disks will grip the tube. These disks, however, do not grip the nut, so that the nut is free to turn. The pressure in the nut against the outer disk, and the outer disk against the ring gasket, will deform the gasket into firm gripping contact with the tube and also into sealing contact with the nut. The ring 12 will also be forced against the end of the body member and make a metal-to-metal seal therewith. The elastic ring gasket 13 will be deformed so as to firmly grip the tube.

When the coupling is closed the tube will not only be gripped by the deformed elastic gasket but also by the metal disks and will be firmly held in the coupling.

It will be noted that the metal disks 12 and 14 form a closed recess in which the elastic gasket is confined so that there is no liability of the gasket being extruded from the recess due to fluid pressure on the line or due to pull out strains on the tube. Fluid pressure on the line bearing against the elastic gasket will tend to deform it radially so as to increase the tightness of the seal. The grip of the rubber sealing gasket on the tube and also the grip of the metal rings on the tube help resist the movement of the tube from the coupling. If the tube does move until the flared end 10 thereof engages the metal ring 12, the rubber gasket, which is incompressible, will act as a trapped fluid column and prevent the ring 12 from being pulled away from the end of the body member so as to destroy the seal.

It will be noted that the flared end 10 of the tube makes no contact with the seat and therefore it is not necessary to flare the tube with any great accuracy, as in the case of couplings where the tube is held by the gripping of the flared end thereof.

It is obvious that minor changes in the details of construction may be made without departing from the spirit of the invention as set forth in the appended claims.

What is claimed is:

1. A coupling for tubes having an enlarged end comprising a body member, a nut having a threaded engagement therewith, said body member having a counterbore adapted to receive the enlarged end of the tube, said nut having a flange at its outer end spaced away from the end of the body member and forming an annular recess within the nut, an annular metal ring surrounding said tube and disposed between the end of the body member and the flange of the nut, a deformable ring gasket surrounding the tube and disposed between said ring and the flange of the nut, said metal ring being initially frusto-conical shaped with the outer portion thereof in engagement with the body member and the inner portion of said ring in engagement with the gasket whereby the turning of the nut onto the body member will cause said ring to flatten into a plane substantially at right angles to the wall of the tube, said ring being dimensioned so as to make gripping contact with the tube when in flattened position and also cause the ring gasket to be deformed into tight sealing contact with the tube.

2. A coupling for tubes having an enlarged end comprising a body member, a nut having a threaded engagement therewith, said body member having a counterbore adapted to receive the enlarged end of the tube, said nut having a flange at its outer end spaced away from the end of the body member and forming an annular recess within the nut, an annular metal ring surrounding said tube and disposed between the end of the body member and the flange of the nut, a deformable ring gasket surrounding the tube and disposed between said ring and the flange of the nut, a second annular metal ring of frusto-conical shape disposed between the deformable ring gasket and the flange of the nut so that the turning of the nut onto the body member will cause the metal rings to flatten into substantially parallel planes at right angles to the wall of the tube, said rings being dimensioned so as to make gripping contact with the tube when in flattened position and also cause the ring gasket to be deformed into tight sealing contact with the tube.

JOHN N. WOLFRAM.

REFERENCES CITED

The following references are of record in the file of this patent:

UNITED STATES PATENTS

| Number | Name | Date |
|---|---|---|
| 1,381,931 | Ostrander | June 21, 1921 |
| 1,440,207 | Burns | Dec. 26, 1922 |
| 2,032,720 | Sander | Mar. 3, 1936 |
| 2,211,776 | Haury | Aug. 20, 1940 |
| 2,341,164 | Shimek | Feb. 8, 1944 |